(12) United States Patent  
Miyazaki

(10) Patent No.: US 11,855,546 B2  
(45) Date of Patent: Dec. 26, 2023

(54) OUTPUT STABILIZATION CIRCUIT AND DC/DC CONVERTER CIRCUIT

(71) Applicant: SUMIDA CORPORATION, Tokyo (JP)

(72) Inventor: Hiroyuki Miyazaki, Natori (JP)

(73) Assignee: SUMIDA CORPORATION

( * ) Notice: Subject to any disclaimer, the term of this patent is extended or adjusted under 35 U.S.C. 154(b) by 106 days.

(21) Appl. No.: 17/685,440

(22) Filed: Mar. 3, 2022

(65) Prior Publication Data

US 2022/0311342 A1  Sep. 29, 2022

(30) Foreign Application Priority Data

Mar. 24, 2021  (JP) ................................ 2021-049647

(51) Int. Cl.
  *H02M 3/338* (2006.01)
  *H02M 1/08* (2006.01)

(52) U.S. Cl.
  CPC ........... *H02M 3/3388* (2013.01); *H02M 1/08* (2013.01)

(58) Field of Classification Search
  CPC .... H02M 3/3388; H02M 1/08; H02M 1/0025; H02M 3/338
  See application file for complete search history.

(56) References Cited

U.S. PATENT DOCUMENTS

| | | | |
|---|---|---|---|
| 4,213,084 A | 7/1980 | Hiromitsu | |
| 4,677,354 A | 6/1987 | Pascal et al. | |
| 4,677,534 A | 6/1987 | Okochi | |
| 6,009,001 A | 12/1999 | Otake | |
| 2005/0281061 A1 | 12/2005 | Radecker et al. | |
| 2006/0120109 A1 | 6/2006 | Inoue et al. | |
| 2006/0176714 A1 | 8/2006 | Yasumura | |
| 2012/0033455 A1* | 2/2012 | Hosotani | H02M 3/3376 363/21.02 |

(Continued)

FOREIGN PATENT DOCUMENTS

| | | |
|---|---|---|
| CN | 1729613 A | 2/2006 |
| JP | H11-285262 A | 10/1999 |
| TW | 200637126 A | 10/2006 |

OTHER PUBLICATIONS

Office Action issued in the corresponding Tawainese Patent Application No. 111105926; dated Apr. 26, 2023 (total 8 pages).

(Continued)

*Primary Examiner* — Adolf D Berhane
*Assistant Examiner* — Afework S Demisse
(74) *Attorney, Agent, or Firm* — Harness, Dickey & Pierce, P.L.C.

(57) ABSTRACT

An output stabilization circuit includes: a primary-side circuit including first and second self-excited oscillator circuits connected to a direct-current power supply; and a secondary-side circuit, wherein the first and second self-excited oscillator circuits include power transmission coils, resonant capacitors, switching element pairs, and feedback coils, the second self-excited oscillator circuit further includes a phase shift filter, the phase shift filter includes a primary-side control coil that is magnetically coupled to a secondary-side control coil included in the secondary-side circuit and that has a characteristic that an inductance changes depending on a current flowing through the secondary-side control coil.

5 Claims, 11 Drawing Sheets

(56) References Cited

U.S. PATENT DOCUMENTS

2013/0250626 A1* 9/2013 Hosotani .......... H02M 3/33576
363/21.02
2021/0006169 A1 1/2021 Miyazaki

OTHER PUBLICATIONS

European Search Report issued for the corresponding European Patent Application No. 22161322.7; dated Aug. 8, 2022 (total 5 pages).

* cited by examiner

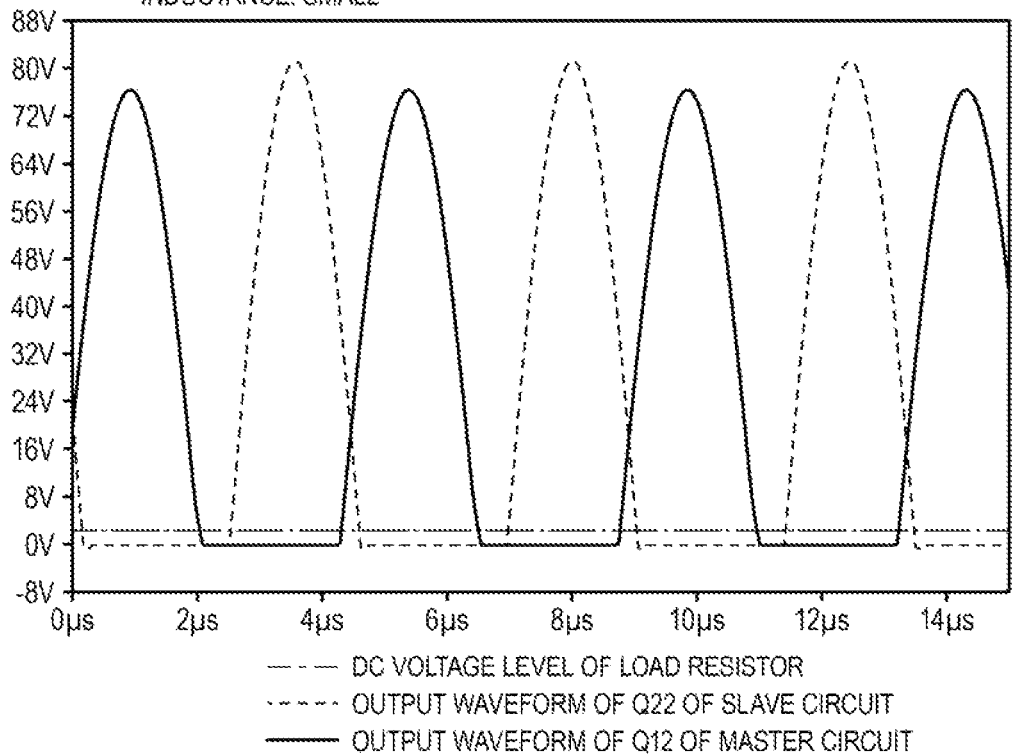
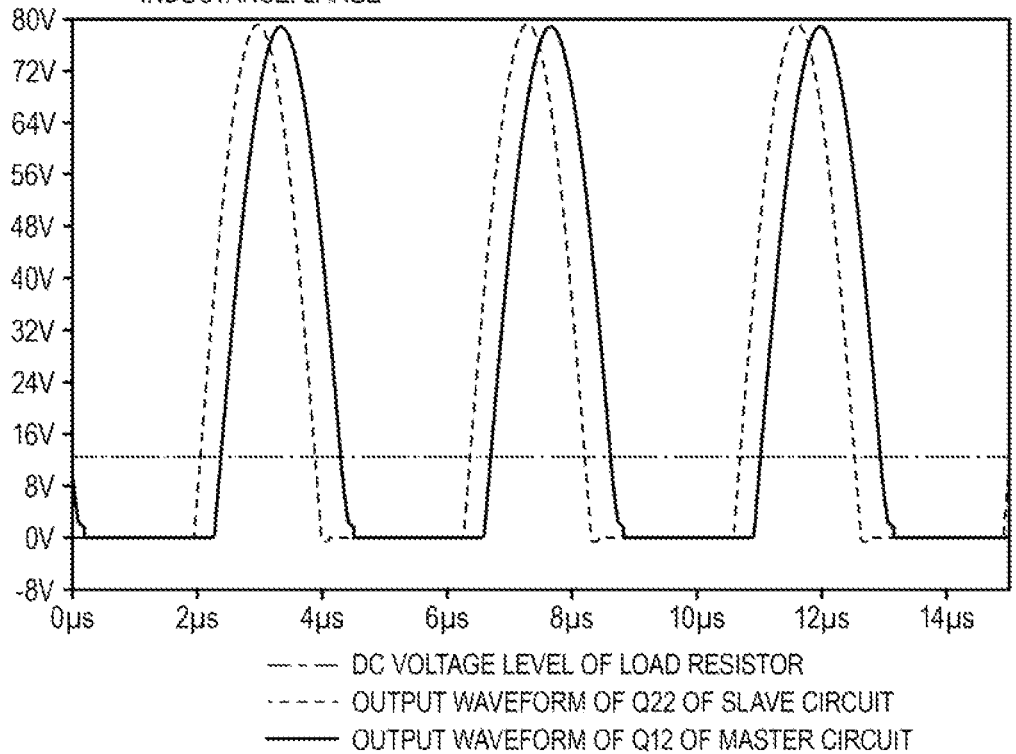

OUTPUT STABILIZATION CIRCUIT AND DC/DC CONVERTER CIRCUIT

CROSS-REFERENCE TO RELATED APPLICATIONS

This application claims the benefits of Japanese Patent Application No. 2021-49647 filed on Mar. 24, 2021 in the Japanese Patent Office, the disclosures of which are herein incorporated in its entirety by reference.

BACKGROUND OF THE INVENTION

The present invention relates to a self-excited oscillator circuit and a DC/DC converter circuit.

There are an inverter circuit, a power supply circuit, and the like that realize simplification of a circuit by adopting a self-excited oscillator circuit that does not use a control IC and the like, unlike a circuit of separately-excited type.

Japanese Laid-open patent publication No. H11-285262 below discloses a self-excited resonant power supply that controls an output voltage by supplying, to gates of first and second transistors, an error signal depending on a deviation between a voltage signal corresponding to an output voltage and a reference signal to thereby shift a self-excited oscillation frequency.

CITATION LIST

Patent Literature

Patent Literature 1: Japanese Laid-open patent publication No. H11-285262

SUMMARY OF THE INVENTION

However, regarding the above-described circuit, for example, raising or lowering of a gate bias of a Field Effect Transistor (FET) may bring the FET into an unsaturated operation, there occurs waveform abnormality deviating from conditions of self-excited oscillation, and FET loss increases due to an increase in reactive current in a parallel resonance unit, and thus there is a concern of a narrow range of application.

The present invention provides a circuit technology for stabilizing an output voltage with a simple circuit configuration without being involved in conditions related to self-excited oscillation.

According to the present invention, there is provided an output stabilization circuit including: a primary-side circuit including a first self-excited oscillator circuit and a second self-excited oscillator circuit connected to a direct-current power supply; and a secondary-side circuit configured to obtain an output voltage by oscillation of the first self-excited oscillator circuit and the second self-excited oscillator circuit, in which the first self-excited oscillator circuit includes: a first power transmission coil; a first resonant capacitor constituting a resonant circuit together with the first power transmission coil; a first pair of switching elements connected to the first power transmission coil; and a first feedback coil magnetically coupled to the first power transmission coil and connected to each control electrode of the first pair of switching elements, the second self-excited oscillator circuit includes: a second power transmission coil; a second resonant capacitor constituting a resonant circuit together with the second power transmission coil; a second pair of switching elements connected to the second power transmission coil; a second feedback coil magnetically coupled to the first feedback coil and connected to each control electrode of the second pair of switching elements; and a phase shift filter connected between the second feedback coil and each control electrode of the second pair of switching elements, the secondary-side circuit includes a secondary-side control coil in which a magnitude of a flowing current is controlled depending on a magnitude of the output voltage, and the phase shift filter includes a primary-side control coil magnetically coupled to the secondary-side control coil and having a characteristic that an inductance changes depending on a current flowing through the secondary-side control coil.

According to the above aspect, it is possible to provide a circuit technology for stabilizing an output voltage with a simple circuit configuration without being involved in conditions related to self-excited oscillation.

BRIEF DESCRIPTION OF THE DRAWINGS

The above and other objects, advantages and features of the present invention will be more apparent from the following description of certain preferred embodiments taken in conjunction with the accompanying drawings, in which:

FIGS. 11A and 11B are graphs each illustrating a result of simulating a voltage change at each point in the power supply circuit according to Example 3.

DESCRIPTION OF EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Below, examples of preferred embodiments (hereinafter, referred to as present embodiments) of the present invention will be described. Note that the following embodiments are merely examples, and the present invention is not limited to the configurations of the following embodiments.

First Embodiment

Figure 1:
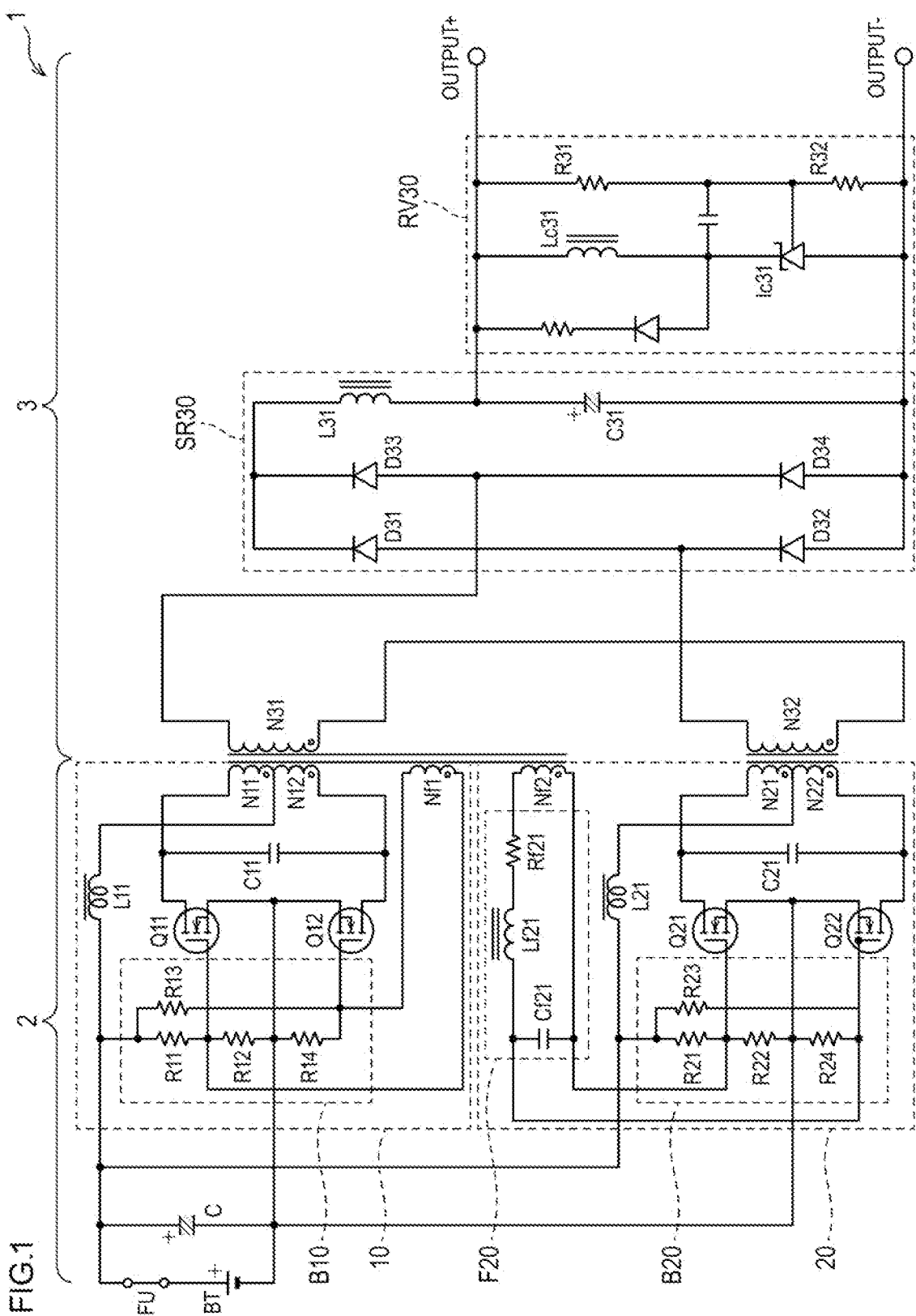
FIG. 1 is a circuit diagram of a power supply circuit according to a first embodiment.

FIG. 1 is a circuit diagram of a power supply circuit 1 according to a first embodiment.

The power supply circuit 1 includes a primary-side circuit 2 including a battery device BT and a secondary-side circuit 3 obtaining an output voltage from the primary-side circuit 2. The power supply circuit 1 is a circuit that stably provides output to a load connected to the secondary-side circuit 3. In the first embodiment, an example is shown in which the battery device BT is a battery device that supplies direct-current power, the secondary-side circuit 3 includes a DC conversion circuit, and the power supply circuit 1 functions as a DC/DC converter circuit as a whole.

[Primary-Side Circuit]

The primary-side circuit 2 further includes a master circuit 10 and a slave circuit 20 connected in parallel to the battery device BT.

The master circuit 10 includes power transmission coils N11 and N12, a resonant capacitor C11, transistors Q11 and Q12 as a pair of switching elements, a bias circuit B10, and a feedback coil Nf1, which constitute a self-excited oscillator circuit.

The power transmission coil N11 and the power transmission coil N12 are connected in series via an intermediate tap. The intermediate tap is connected to a positive terminal of the battery device BT via an input coil L11. Hereinafter, what is meant by one end of the power transmission coil N11 or one end of the power transmission coil N12 is one end of the power transmission coil N11 or N12 on a side opposite to an intermediate tap side.

One end of the power transmission coil N11 is connected to a negative terminal of the battery device BT via the transistor Q11, and one end of the power transmission coil N12 is connected to the negative terminal of the battery device BT via the transistor Q12.

The resonant capacitor C11 is connected in parallel to the power transmission coils N11 and N12, and constitutes a resonant circuit together with the power transmission coils N11 and N12.

The transistors Q11 and Q12 are Field Effect Transistors (FETs) and can be referred to as a pair of switching elements. A drain of the transistor Q11 is connected to one end of the power transmission coil N11, and a drain of the transistor Q12 is connected to one end of the power transmission coil N12. Sources of the transistors Q11 and Q12 are connected to the negative terminal of the battery device BT. Gates of the transistors Q11 and Q12 are connected to the bias circuit B10.

The bias circuit B10 includes resistance elements R11, R12, R13, and R14. The bias circuit B10 is connected in parallel to the battery device BT, and applies a bias voltage to the gates of the transistors Q11 and Q12.

The feedback coil Nf1 is provided to be magnetically coupled to the power transmission coils N11 and N12. One end of the feedback coil Nf1 is connected to the gate (control electrode) of the transistor Q11, and another end of the feedback coil Nf1 is connected to the gate (control electrode) of the transistor Q12.

The slave circuit 20 has a configuration similar to the configuration of the master circuit 10 except for a phase shift filter F20. Specifically, the slave circuit 20 includes power transmission coils N21 and N22, a resonant capacitor C21, transistors Q21 and Q22 as a pair of switching elements, a bias circuit B20, and a feedback coil Nf2, which constitute a self-excited oscillator circuit.

The power transmission coils N21 and N22 correspond to the power transmission coils N11 and N12 described above, the resonant capacitor C21 corresponds to the resonant capacitor C11 described above, the transistors Q21 and Q22 correspond to the transistors Q11 and Q12 described above, the bias circuit B20 (resistance elements R21, R22, R23 and R24) corresponds to the bias circuit B10 (resistance elements R11, R12, R13 and R14) described above, and the feedback coil Nf2 corresponds to the feedback coil Nf1 described above.

With respect to these components of the slave circuit 20, the description of the same contents (connection form and the like) as those of the corresponding components of the master circuit 10 will not be repeated.

The feedback coil Nf2 of the slave circuit 20 is provided to be magnetically coupled to the power transmission coils N11 and N12 and the feedback coil Nf1 of the master circuit 10. Furthermore, the feedback coil Nf2 is magnetically coupled to the feedback coil Nf1 such that polarities thereof are in the same direction. The feedback coil Nf2 is not magnetically coupled to the power transmission coils N21 and N22 of the slave circuit 20.

In the present embodiment, the power transmission coil N11, the power transmission coil N12, and the feedback coil Nf1 of the master circuit 10, and the feedback coil Nf2 of the slave circuit 20 constitute a transformer (first transformer) together with a power reception coil N31 of the secondary-side circuit 3, and the power transmission coils N21 and N22 of the slave circuit 20 constitute a transformer (second transformer) together with a power reception coil N32 of the secondary-side circuit 3.

As described above, in the present embodiment, the primary-side circuit 2 and the secondary-side circuit 3 are electrically insulated from each other, and are configured to be capable of transmitting power from the primary-side circuit 2 to the secondary-side circuit 3 by electromagnetic induction of the first transformer and the second transformer.

The phase shift filter F20 is connected between the feedback coil Nf2 and the gates (control electrodes) of the transistors Q21 and Q22. The phase shift filter F20 includes a resistance element Rf21, a primary-side control coil Lf21, and a capacitor Cf21, and can also be referred to as an RLC filter. The resistance element Rf21 and the primary-side control coil Lf21 are connected in series to the feedback coil Nf2, and the capacitor Cf21 is connected in parallel to the feedback coil Nf2. Consequently, the phase shift filter F20 constitutes a low-pass filter.

With such a configuration, the phase shift filter F20 acts to delay the phase of an alternating-current voltage generated in the feedback coil Nf2 in association with a magnetic field generated in the first transformer by a current in the power transmission coil N11 or N12.

The primary-side control coil Lf21 of the phase shift filter F20 is magnetically coupled to a secondary-side control coil Lc31 to be described later of the secondary-side circuit 3, and has a characteristic that inductance changes depending on a current flowing through the secondary-side control coil Lc31. Since the inductance of the primary-side control coil Lf21 is variable as described above, the magnitude of the phase shift by the phase shift filter F20 is variable.

In addition to the above-described configuration, the primary-side circuit 2 includes a fuse FU and a capacitor C.

The fuse FU disconnects the battery device BT from the primary-side circuit 2 when an excessive current is generated due to an abnormality in the self-excited oscillator circuits (the master circuit 10 and the slave circuit 20) of the primary-side circuit 2. Consequently, abnormal heating of the battery device BT associated with the excessive current can be prevented.

The capacitor C absorbs a voltage change associated with charge and discharge of the battery device BT.

[Secondary-Side Circuit]

The secondary-side circuit 3 includes the power reception coils N31 and N32, a rectifier circuit SR30, and a reference voltage circuit RV30.

As described above, the power reception coil N31 constitutes, as a secondary-side coil, a transformer in which the power transmission coil N11 and the power transmission coil N12 of the power supply circuit 1 are primary-side coils, and generates an induced electromotive force by a current in the power transmission coil N11 or N12.

As described above, the power reception coil N32 constitutes, as a secondary-side coil, a transformer in which the power transmission coil N21 and the power transmission coil N22 of the power supply circuit 1 are primary-side coils, and generates an induced electromotive force by a current in the power transmission coil N21 or N22.

The power reception coil N31 and the power reception coil N32 are connected in series such that coil voltages are opposite in phase. Consequently, when a voltage induced in the power reception coil N31 and a voltage induced in the power reception coil N32 are synchronized with each other, output is theoretically zero.

The rectifier circuit SR30 is connected to the power reception coils N31 and N32. The rectifier circuit SR30 includes a bridge rectifier circuit including diodes D31, D32, D33, and D34, and a smoothing filter including a coil L31 and a capacitor C31, and functions as a full-wave rectifier circuit. That is, the rectifier circuit SR30 performs full-wave rectification and smoothing on an alternating-current voltage generated in each of the power reception coils N31 and N32 to convert the alternating-current voltage into a direct-current voltage.

The reference voltage circuit RV30 is a circuit that includes resistance elements R31 and R32 and a shunt regulator element Ic31 and stabilizes an output voltage from the secondary-side circuit 3 to be equal to or higher than a reference voltage.

The shunt regulator element Ic31 receives, at a reference terminal, an input of a voltage obtained by dividing the output voltage by the resistance elements R31 and R32, and controls a voltage between the reference and an anode to be a reference voltage.

The reference voltage circuit RV30 further includes the secondary-side control coil Lc31.

A current depending on the voltage control of the shunt regulator element Ic31 flows through the secondary-side control coil Lc31. That is, when the output voltage becomes higher than the reference voltage, the current flowing through the secondary-side control coil Lc31 increases, and when the output voltage becomes lower than the reference voltage, the current flowing through the secondary-side control coil Lc31 decreases.

As described above, the secondary-side control coil Lc31 is magnetically coupled to the primary-side control coil Lf21, and the inductance of the primary-side control coil Lf21 is variable depending on the amount of current flowing through the secondary-side control coil Lc31.

The primary-side control coil Lf21 and the secondary-side control coil Lc31 form a single-magnetic-path transformer provided on a common core as a primary winding and a secondary winding. For example, the transformer is configured to have direct-current superposition characteristics of inductance such that the inductance reduction rate of the primary-side control coil Lf21 increases as the direct current flowing through the secondary-side control coil Lc31 increases. Consequently, in the phase shift filter F20, due to RLC filter characteristics, a phase shift amount increases (a phase difference between an output signal of the feedback coil Nf2 and signals input to the gates of the transistors Q21 and Q22 increases) as an inductance value of the primary-side control coil Lf21 increases.

With such a configuration, the phase shift amount by the phase shift filter F20 can be increased or decreased depending on an output voltage from the secondary-side circuit 3, and eventually, the output voltage from the secondary-side circuit 3 can be stabilized.

Below, an operation of the power supply circuit 1 according to the first embodiment having the above-described configuration will be described.

In the master circuit 10, when direct-current power is supplied from the battery device BT to the bias circuit B10, a voltage divided by the resistance elements R11 and R12 is applied as a bias voltage to the gate of the transistor Q11, and a voltage divided by the resistance elements R13 and R14 is applied as a bias voltage to the gate of the transistor Q12. Consequently, either the transistor Q11 or Q12 is turned on first depending on transistor characteristics, resistance values of the resistance elements R11 and R13, and the like.

At that time, in a case where the transistor Q11 is turned on, a current flows through the power transmission coil N11, and a current flows between the drain and the source of the transistor Q11.

When a current flows through the power transmission coil N11 as a primary winding, a magnetic field is generated in the first transformer, and an induced electromotive force is generated in the power reception coil N31 as a secondary winding. The induced electromotive force to be generated in the power reception coil N31 can be amplified depending on a winding ratio between the power transmission coil N11 and the power reception coil N31.

When the magnetic field is generated in the first transformer, also in the feedback coils Nf1 and Nf2 which are primary windings, an inverse electromotive force is generated by self-induction.

When the inverse electromotive force is generated in the feedback coil Nf1, a negative voltage is applied to the transistor Q11, the bias voltage applied to the transistor Q11 becomes equal to or less than a threshold voltage, and thus the transistor Q11 is turned off. Meanwhile, a positive voltage is applied to the transistor Q12, the bias voltage applied to the transistor Q12 exceeds the threshold voltage, and thus the transistor Q12 is turned on.

When the transistor Q11 is turned off and the transistor Q12 is turned on, a current flows through the power transmission coil N12, and a current flows between the drain and the source of the transistor Q12.

When a current flows through the power transmission coil N12 as a primary winding, a magnetic field is generated in the first transformer, and an induced electromotive force is generated in the power reception coil N31 as a secondary winding.

As described above, in the master circuit 10, the turning on and the turning off of each of the transistors Q11 and Q12 are alternately repeated, and thereby currents in directions opposite to each other flow alternately through the power transmission coils N11 and N12 which are primary windings.

Meanwhile, the slave circuit 20 operates similarly. That is, when direct-current power is supplied from the battery device BT to the bias circuit B20, a voltage divided by the resistance elements R21 and R22 is applied as a bias voltage to the gate of the transistor Q21, and a voltage divided by the resistance elements R23 and R24 is applied as a bias voltage to the gate of the transistor Q22. Consequently, either the transistor Q21 or Q22 is turned on first depending on transistor characteristics, resistance values of the resistance elements R21 and R23, and the like.

At that time, in a case where the transistor Q21 is turned on, a current flows through the power transmission coil N21, and a current flows between the drain and the source of the transistor Q21.

When a current flows through the power transmission coil N21 which is a primary winding, a magnetic field is generated in the second transformer, and an induced electromotive force is generated in the power reception coil N32 which is a secondary winding. The induced electromotive force to be generated in the power reception coil N32 can be amplified depending on a winding ratio between the power transmission coil N21 and the power reception coil N32.

At that time, a similar operation occurs also in the master circuit 10 as described above, and the inverse electromotive force is generated also in the feedback coil Nf2 which is a primary winding by self-induction due to the magnetic field generated in the first transformer of the master circuit 10. Here, the phase of the voltage generated in the feedback coil Nf2 is shifted by the phase shift filter F20, and the voltage is applied to the transistors Q21 and Q22. At that time, a negative voltage is applied to the transistor Q21, the bias voltage applied to the transistor Q21 becomes equal to or lower than a threshold voltage, and thus the transistor Q21 is turned off. Meanwhile, a positive voltage is applied to the transistor Q22, the bias voltage applied to the transistor Q22 exceeds the threshold voltage, and thus the transistor Q22 is turned on.

When the transistor Q21 is turned off and the transistor Q22 is turned on, a current flows through the power transmission coil N22, and a current flows between the drain and the source of the transistor Q22.

When a current flows through the power transmission coil N22 which is a primary winding, a magnetic field is generated in the second transformer, and an induced electromotive force is generated in the power reception coil N32 which is a secondary winding.

As described above, in the slave circuit 20, the turning on and the turning off of each of the transistors Q21 and Q22 are alternately repeated, and thereby currents in directions opposite to each other flow alternately through the power transmission coils N21 and N22 which are primary windings.

However, in the slave circuit 20, the phase of the voltage generated in the feedback coil Nf2 is shifted by the action of the phase shift filter F20, so that timings of turning on/off the transistors Q21 and Q22 are shifted from timings of turning on/off the transistors Q11 and Q12 of the master circuit 10. As a result, switching timings of currents in the power transmission coils N21 and N22 and switching timings of currents in the power transmission coils N11 and N12 are shifted from each other.

By such an operation of the primary-side circuit 2, a magnetic field is generated in each of the first transformer and the second transformer, and an alternating-current voltage including alternately generated positive and negative voltages is induced in each of the power reception coils N31 and N32 which are secondary windings of the secondary-side circuit 3.

However, as described above, since the switching timings of the currents in the power transmission coils N21 and N22 and the switching timings of the currents in the power transmission coils N11 and N12 are shifted from each other, the phase of the alternating-current voltage induced in the power reception coil N31 and the phase of the alternating-current voltage induced in the power reception coil N32 are also shifted from each other.

In the secondary-side circuit 3, the alternating-current voltage generated in the power reception coil N31 and the alternating-current voltage generated in the power reception coil N32 are combined and input to the rectifier circuit SR30, and converted into a direct-current voltage by full-wave rectification and smoothing.

When the converted direct-current voltage is input to the reference voltage circuit RV30, the direct-current voltage is controlled by the shunt regulator element Ic31 so that the output voltage becomes equal to or higher than the reference voltage, and then output.

At that time, a current in an amount depending on the output voltage flows through the secondary-side control coil Lc31. The inductance value of the primary-side control coil Lf21 magnetically coupled to the secondary-side control coil Lc31 changes depending on the amount of the current. As the inductance value of the primary-side control coil Lf21 changes, the phase shift amount by the phase shift filter F20 changes.

In the present embodiment, the power reception coil N31 and the power reception coil N32 are connected such that the coil voltages are opposite in phase, and therefore, the more accurately the alternating-current voltage generated in the power reception coil N31 is synchronized with the alternating-current voltage generated in the power reception coil N32 (the more accurately the phases are matched), the lower the output voltage becomes. The closer the phase shift is to 90 degrees, the higher the output voltage becomes.

Therefore, by the actions of the primary-side control coil Lf21, the resistance element Rf21, and the capacitor Cf21 described above, the phase shift filter F20 performs phase shift in a direction in which the alternating-current voltages generated in the power reception coils N31 and N32 are synchronized with each other when the amount of a current flowing through the secondary-side control coil Lc31 is large, and performs phase shift in a direction in which the phases of the alternating-current voltages generated in the power reception coils N31 and N32 are shifted from each other when the amount of the current flowing through the secondary-side control coil Lc31 is small.

Thus, an existing self-excited oscillator circuit of collector resonant type causes an output voltage to fluctuate depending on the fluctuation of an input direct-current voltage, but, according to the present embodiment, it is possible by such a phase shift operation to stabilize an output voltage with a simple circuit configuration. Therefore, the power supply circuit 1 according to the present embodiment can be referred to as an output stabilization circuit.

Modification of First Embodiment

In the first embodiment described above, the power supply circuit 1 as a DC/DC converter circuit that outputs a direct-current voltage has been exemplified, but it is also possible to employ a circuit configuration in which a sine wave voltage is output by modifying the secondary-side circuit 3.

Figure 2:
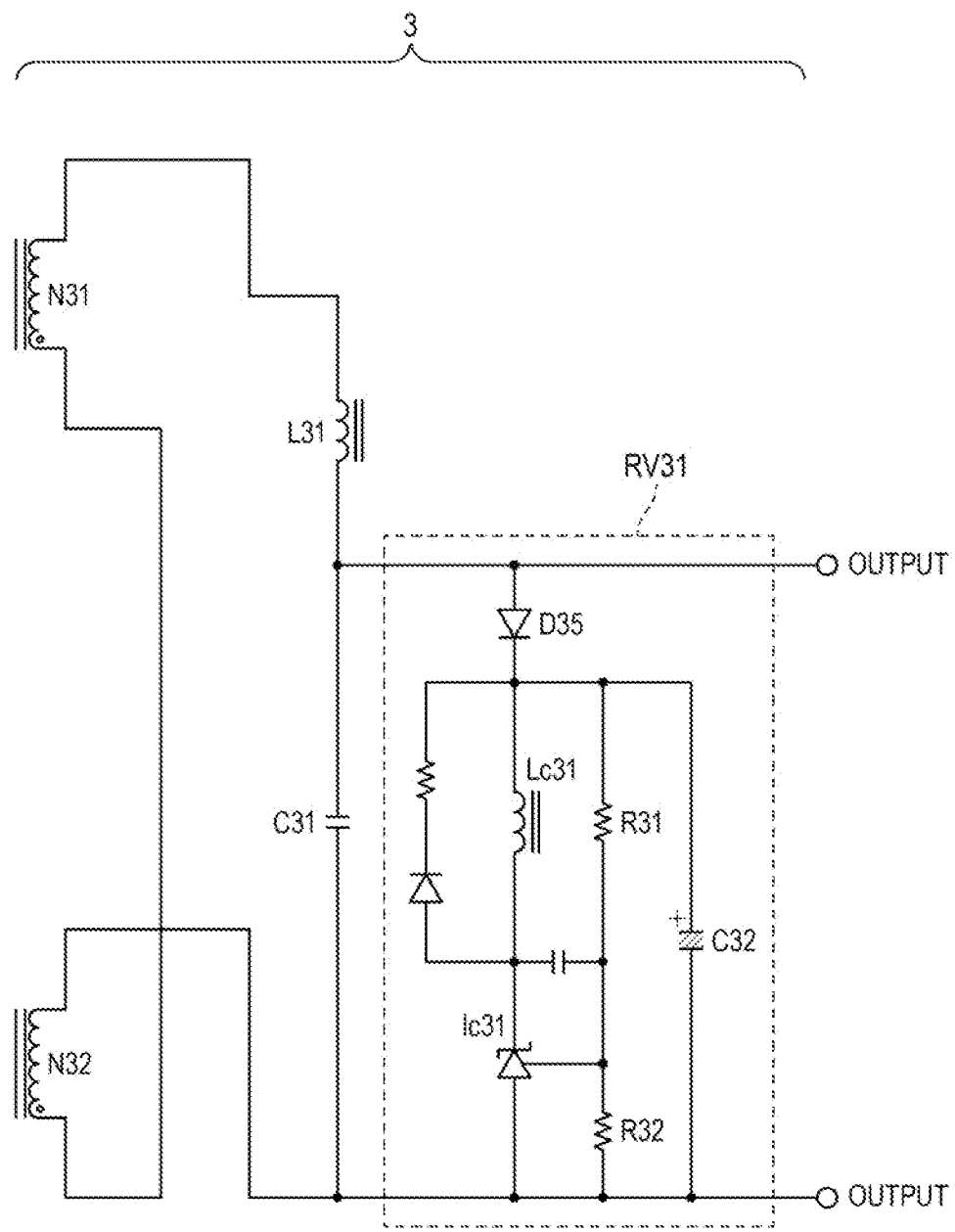
FIG. 2 is a circuit diagram of a secondary-side circuit according to a modification of the first embodiment.

FIG. 2 is a circuit diagram of a secondary-side circuit 3 according to a modification of the first embodiment. In the present modification, the primary-side circuit 2 may have a configuration similar to that in the first embodiment illustrated in FIG. 1.

In the present modification, the secondary-side circuit 3 does not include the bridge rectifier circuit including the diodes D31, D32, D33, and D34. A reference voltage circuit RV31 further includes a diode D35 and a capacitor C32 in addition to the configuration of the reference voltage circuit RV30 of the first embodiment.

In the secondary-side circuit 3 of the present modification, the alternating-current voltage (sine wave voltage) generated in the power reception coil N31 and the alternating-current voltage (sine wave voltage) generated in the power reception coil N32 are combined, a high-frequency noise component is removed by low-pass filters (L31 and C31), and then the resultant is input to the reference voltage circuit RV31.

In the reference voltage circuit RV31, since an alternating current is rectified and smoothed by the diode D35 and the capacitor C32 to be a direct current, actions thereafter are the same as those of the reference voltage circuit RV30 of the first embodiment, and the output can be stabilized.

Thus, according to the present modification, "stabilized sine wave output" can be obtained by taking output after the low-pass filters (L31 and C31).

Second Embodiment

Figure 3:
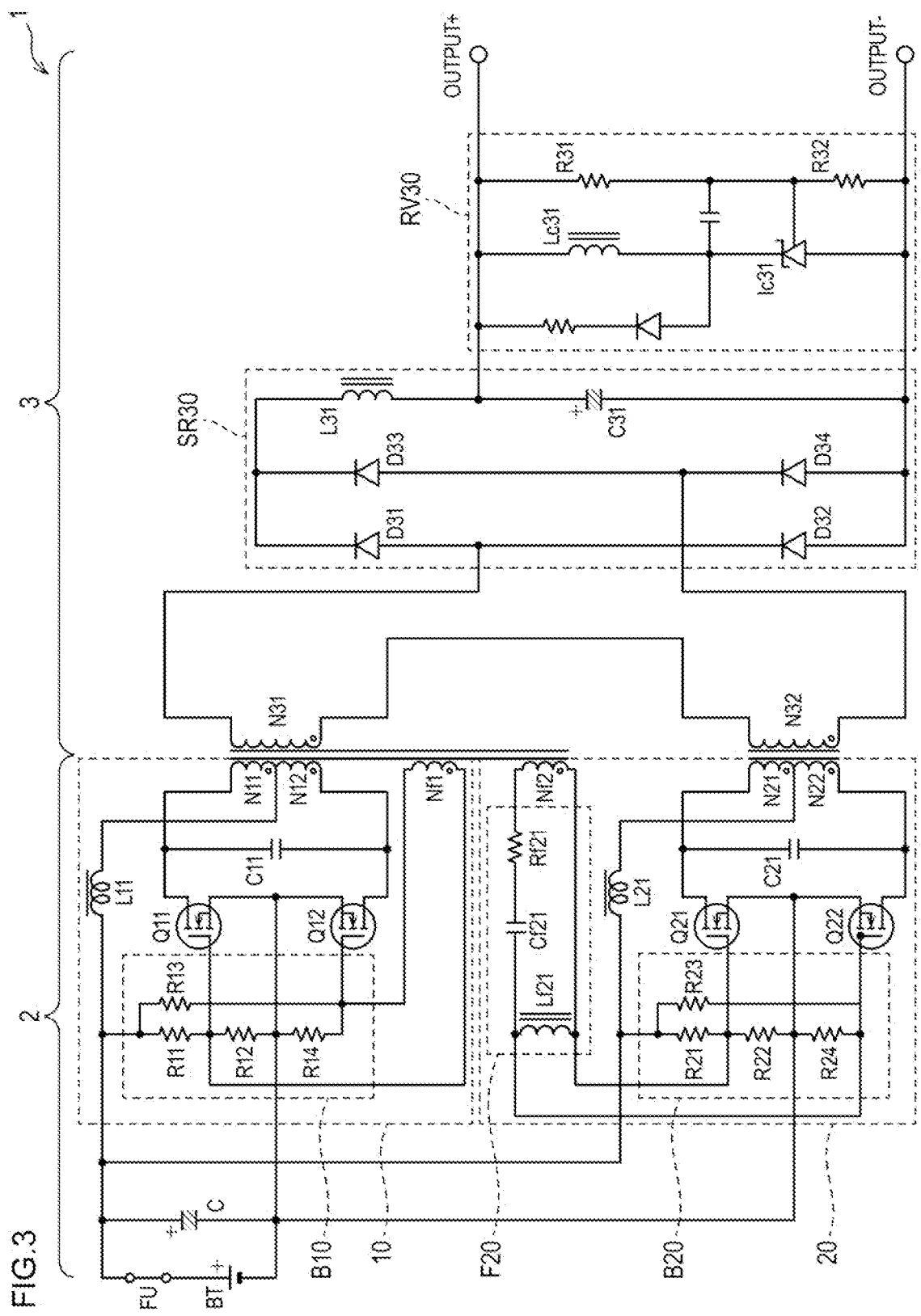
FIG. 3 is a circuit diagram of a power supply circuit according to a second embodiment.

FIG. 3 is a circuit diagram of a power supply circuit 1 according to a second embodiment.

The power supply circuit 1 according to the second embodiment is different from that of the first embodiment in that the power reception coil N31 and the power reception coil N32 are connected such that coil voltages are in phase in the secondary-side circuit 3, and in a configuration of a phase shift filter F20. Below, the power supply circuit 1 according to the second embodiment will be described focusing on contents different from those of the first embodiment, and the same contents as those of the first embodiment will not be repeated.

In the second embodiment, the power reception coil N31 and the power reception coil N32 are connected such that the coil voltages are in phase, and therefore, the more accurately the alternating-current voltage generated in the power reception coil N31 is synchronized with the alternating-current voltage generated in the power reception coil N32 (the more accurately the phases are matched), the higher the output voltage becomes. The closer the phase shift is to 90 degrees, the lower the output voltage becomes.

Therefore, the phase shift filter F20 needs to perform phase shift in a direction in which the phases of the alternating-current voltages generated in the power reception coils N31 and N32 are shifted from each other when the amount of a current flowing through the secondary-side control coil Lc31 is large, and needs to perform phase shift in a direction in which the alternating-current voltages generated in the power reception coils N31 and N32 are synchronized with each other when the amount of the current through the secondary-side control coil Lc31 is small.

Accordingly, in the phase shift filter F20 of the second embodiment, the second feedback coil Nf2 and the capacitor Cf21 are connected in series, and the primary-side control coil Lf21 is connected in parallel to the second feedback coil Nf2 and the capacitor Cf21. That is, the phase shift filter F20 enables the above-described phase shift by constituting a high-pass filter.

Thus, according to the second embodiment, even when the power reception coil N31 and the power reception coil N32 are connected such that the coil voltages are in phase in the secondary-side circuit 3, the output voltage can be stabilized with a simple circuit configuration similarly to the first embodiment.

Modification of Second Embodiment

When the power reception coil N31 and the power reception coil N32 are connected such that the coil voltages are in phase in the secondary-side circuit 3, it is also possible to employ, as a configuration of the phase shift filter F20, the configuration same as that in the first embodiment. In such a case, the feedback coil Nf1 and the feedback coil Nf2 can be magnetically coupled such that polarities thereof are in opposite directions.

With the above configuration, a voltage induced in the feedback coil Nf1 and a voltage induced in the feedback coil Nf2 can be opposite in phase, so that an effect similar to that of the first embodiment can be obtained even when the power reception coil N31 and the power reception coil N32 are connected such that the coil voltages are in phase in the secondary-side circuit 3.

Below, the above-described contents will be described in more detail with reference to examples. However, the description of the following examples does not add any limitation to the above-described contents.

Example 1

Example 1 shows a result of verifying the effect of the first embodiment described above by simulation.

Figure 4:
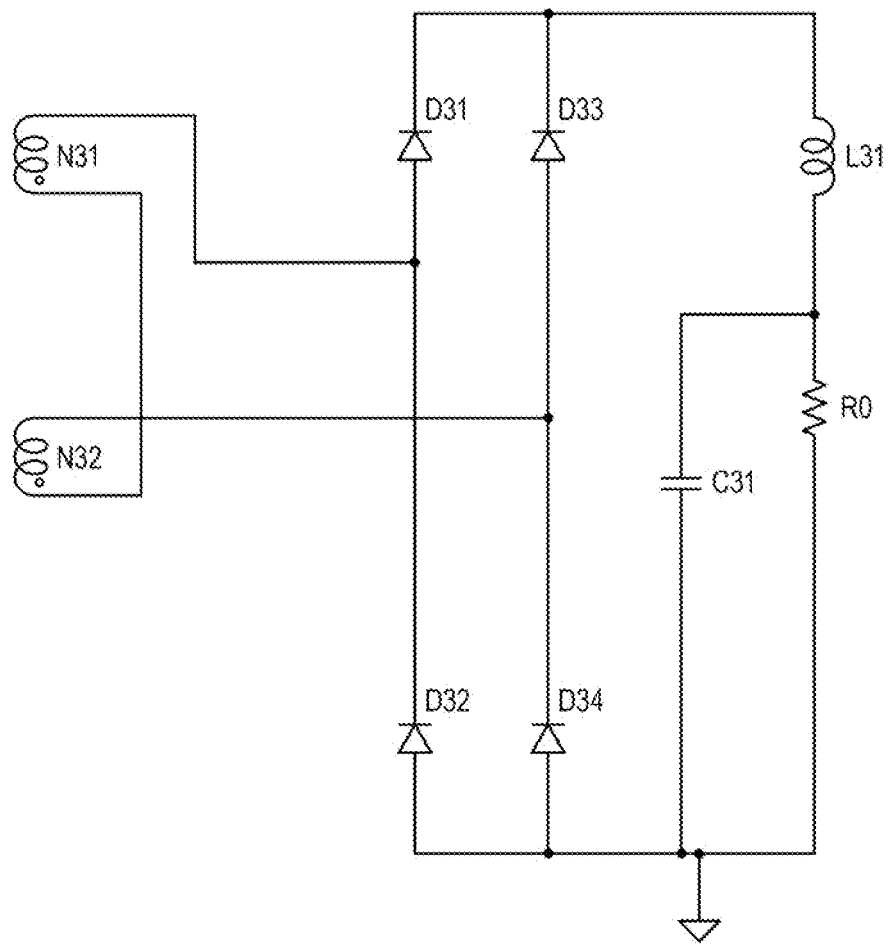
FIG. 4 is a circuit diagram of a secondary-side circuit of a power supply circuit according to Example 1.

FIG. 4 is a circuit diagram of a secondary-side circuit 3 of a power supply circuit 1 according to Example 1.

In the simulation of Example 1, the inductance of the primary-side control coil Lf21 was not controlled by magnetic coupling between the primary-side control coil Lf21 and the secondary-side control coil Lc31, and an inductance value of the primary-side control coil Lf21 was set virtually manually.

Therefore, the reference voltage circuit RV30 is not provided in the secondary-side circuit 3, and a load resistor RO is connected thereto. The primary-side circuit 2 has a configuration similar to that in the first embodiment illustrated in FIG. 1.

Figure 5A:
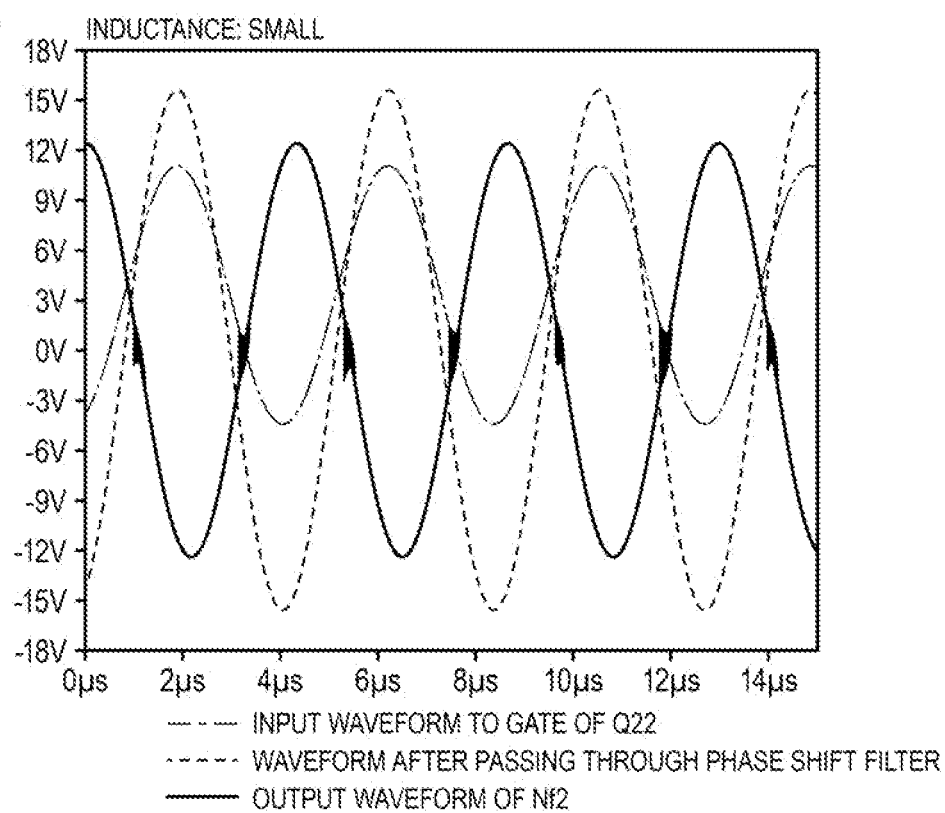
FIGS. 5A and 5B are graphs each illustrating a result of simulating a voltage change at each point in the power supply circuit according to Example 1.

FIGS. 5A to 7B are graphs each illustrating a result of simulating a voltage change at each point in the power supply circuit 1 according to Example 1. FIGS. 5A, 6A, and 7A each illustrate a simulation result in a case where the inductance value of the primary-side control coil Lf21 is set to a first value, and FIGS. 5B, 6B, and 7B each illustrate a simulation result in a case where the inductance value of the primary-side control coil Lf21 is set to a second value larger than the first value.

Figure 5B:
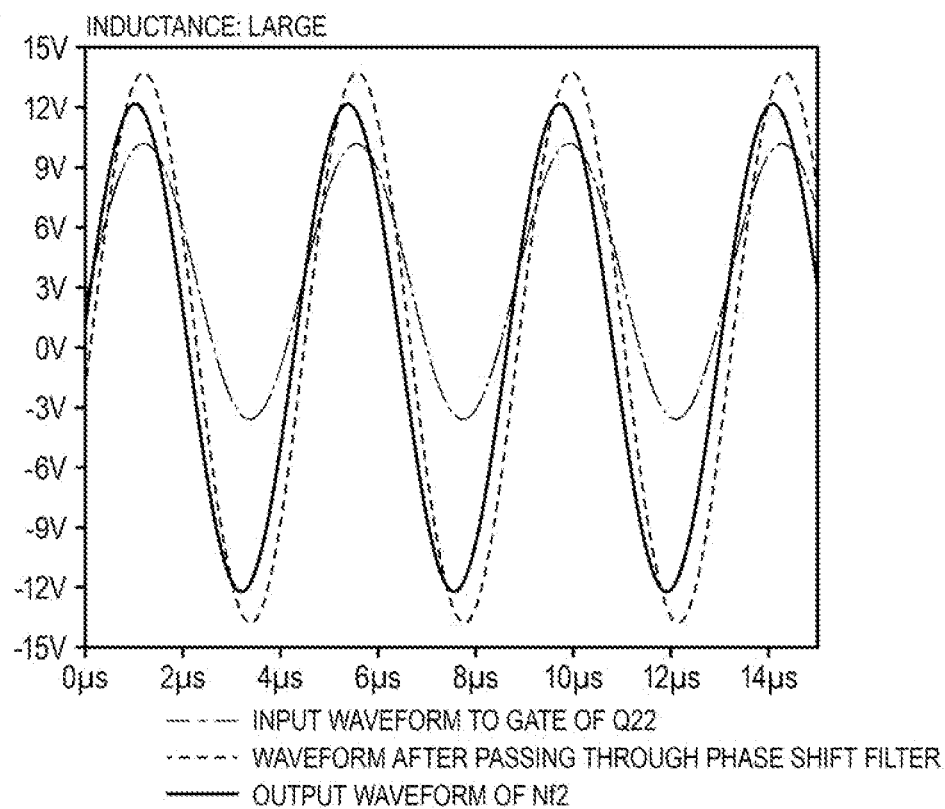

FIGS. 5A and 5B illustrate a voltage waveform (output waveform) induced in the feedback coil Nf2, a voltage waveform after the phase shift filter F20 is applied to that induced in the feedback coil Nf2 (after passing through the phase shift filter F20), and a voltage waveform input to the gate of the transistor Q22.

As can be seen from FIG. 5A, in a state where the inductance value of the primary-side control coil Lf21 is the first value (small), the phase of the voltage generated in the feedback coil Nf2 is greatly shifted by the phase shift filter F20 to apply to the gate of the transistor Q22.

Meanwhile, as can be seen from FIG. 5B, in a state where the inductance value of the primary-side control coil Lf21 is the second value (large), the phase shift amount by the phase shift filter F20 is smaller than that in the case of FIG. 5A, the phase of the voltage generated in the feedback coil Nf2 is slightly shifted by the phase shift filter F20 to apply to the gate of the transistor Q22.

Figure 6A:
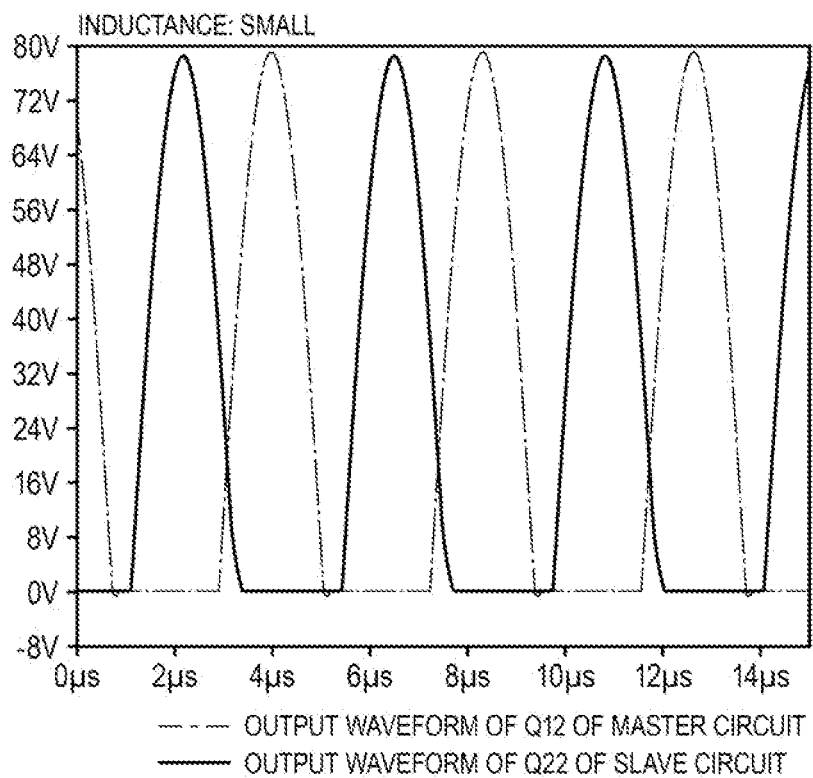
FIGS. 6A and 6B are graphs each illustrating a result of simulating a voltage change at each point in the power supply circuit according to Example 1.
Figure 6B:
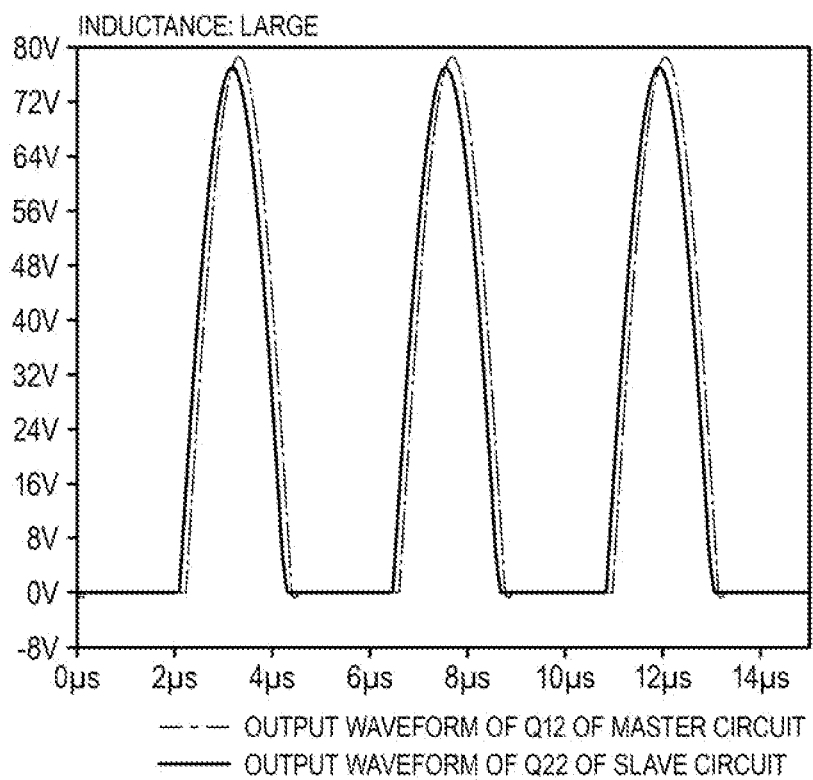

FIGS. 6A and 6B illustrate a voltage waveform (output waveform) between the drain and the source of the transistor Q12 of the master circuit 10 and a voltage waveform (output waveform) between the drain and the source of the transistor Q22 of the slave circuit 20.

As can be seen from FIG. 6A, in a state where the inductance value of the primary-side control coil Lf21 is the first value (small), the phase of the voltage waveform of the transistor Q12 of the master circuit 10 and the phase of the voltage waveform of the transistor Q22 of the slave circuit 20 are greatly shifted from each other. This indicates that the switching timings of the transistors Q11 and Q12 of the master circuit 10 and the switching timings of the transistors Q21 and Q22 of the slave circuit 20 can be greatly shifted from each other by increasing the phase shift amount of the voltage waveform generated in the feedback coil Nf2.

Meanwhile, as can be seen from FIG. 6B, in a state where the inductance value of the primary-side control coil Lf21 is the second value (large), the phase shift between the voltage waveform of the transistor Q12 of the master circuit 10 and the voltage waveform of the transistor Q22 of the slave circuit 20 is small. This indicates that the shift between the switching timings of the transistors Q11 and Q12 of the master circuit 10 and the switching timings of the transistors Q21 and Q22 of the slave circuit 20 can be reduced by decreasing the phase shift amount of the voltage waveform generated in the feedback coil Nf2.

Figure 7A:
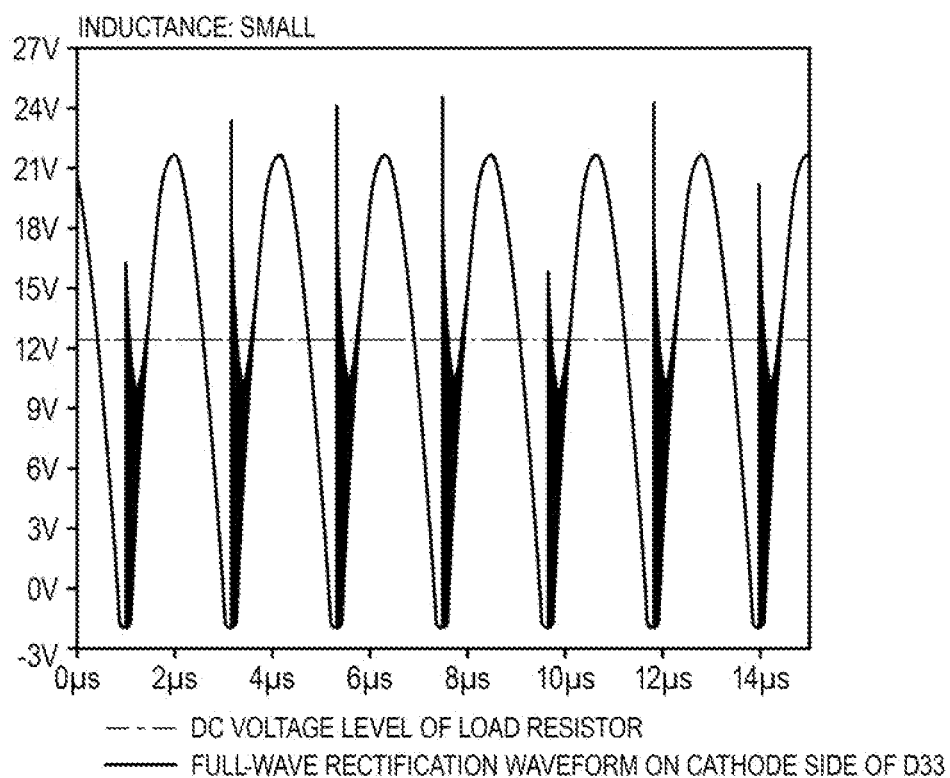
FIGS. 7A and 7B are graphs each illustrating a result of simulating a voltage change at each point in the power supply circuit according to Example 1.
Figure 7B:
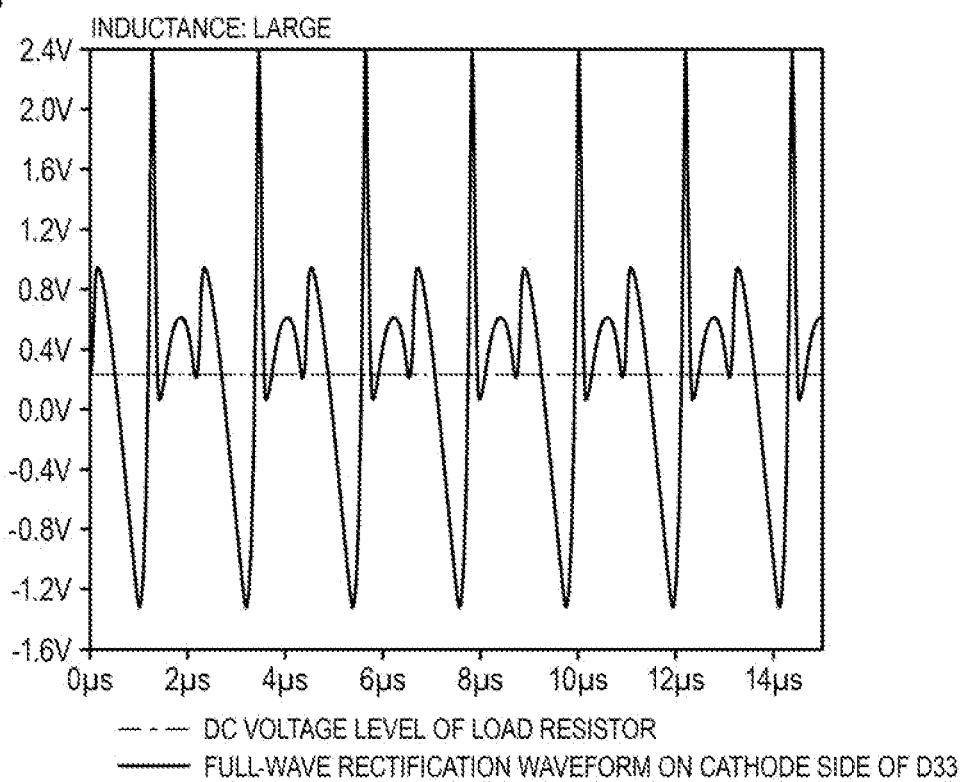

FIGS. 7A and 7B illustrate a direct-current voltage level applied to the load resistor and a full-wave rectification waveform on a cathode side of the diode D33.

As can be seen from FIG. 7A, in a state where the inductance value of the primary-side control coil Lf21 is the first value (small), the phase of the voltage waveform generated in the power reception coil N31 and the phase of the voltage waveform generated in the power reception coil N32 are greatly shifted from each other, and a direct-current voltage level of a combined voltage waveform after full-wave rectification is relatively high.

Meanwhile, as can be seen from FIG. 7B, in a state where the inductance value of the primary-side control coil Lf21 is the second value (large), a phase difference between the voltage waveform generated in the power reception coil N31 and the voltage waveform generated in the power reception coil N32 is small, so that a direct-current voltage level of a combined voltage waveform after full-wave rectification is lower than that in the case of FIG. 7A.

As described above, according to Example 1, it has been demonstrated that in the power supply circuit 1 of the first embodiment, the output voltage can be controlled by changing the phase shift amount by the phase shift filter F20 depending on the magnitude of the inductance value of the primary-side control coil Lf21, and eventually, the output voltage can be stabilized.

Example 2

Example 2 shows a result of verifying the effect of the modification of the first embodiment described above by simulation.

Figure 8:
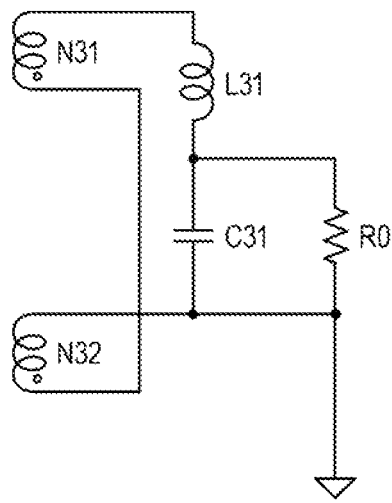
FIG. 8 is a circuit diagram of a secondary-side circuit of a power supply circuit according to Example 2.

FIG. 8 is a circuit diagram of a secondary-side circuit 3 of a power supply circuit 1 according to Example 2.

Also in the simulation of Example 2, similarly to Example 1, an inductance value of the primary-side control coil Lf21 was set virtually manually.

Therefore, the reference voltage circuit RV30 is not provided in the secondary-side circuit 3, and the load resistor RO is connected thereto. The primary-side circuit 2 has a configuration similar to that in the first embodiment illustrated in FIG. 1.

Figure 9A:
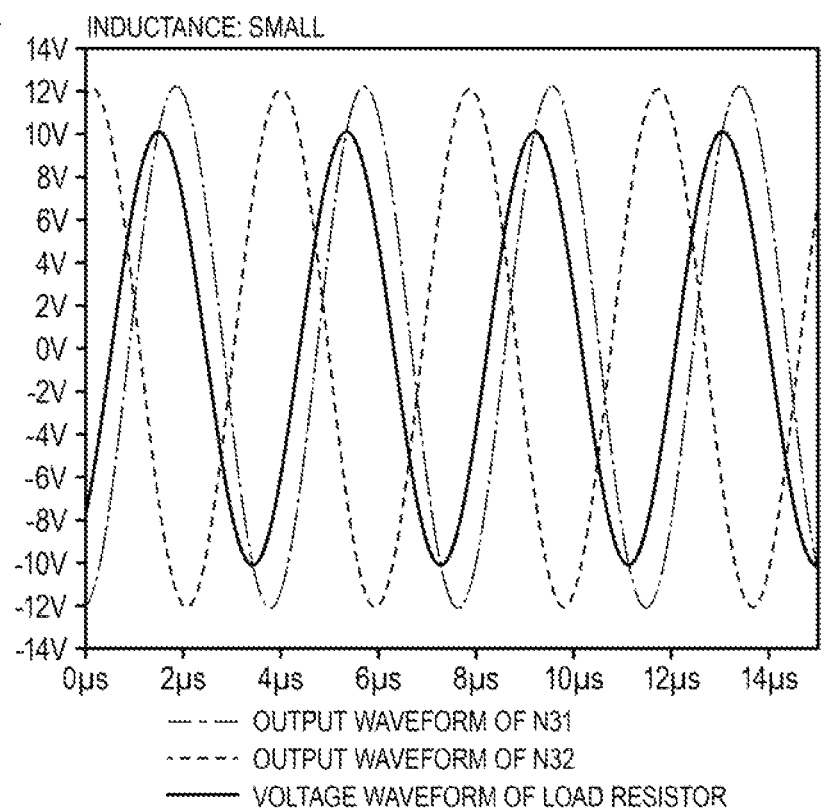
FIGS. 9A and 9B are graphs each illustrating a result of simulating a voltage change at each point in the power supply circuit according to Example 2.
Figure 9B:
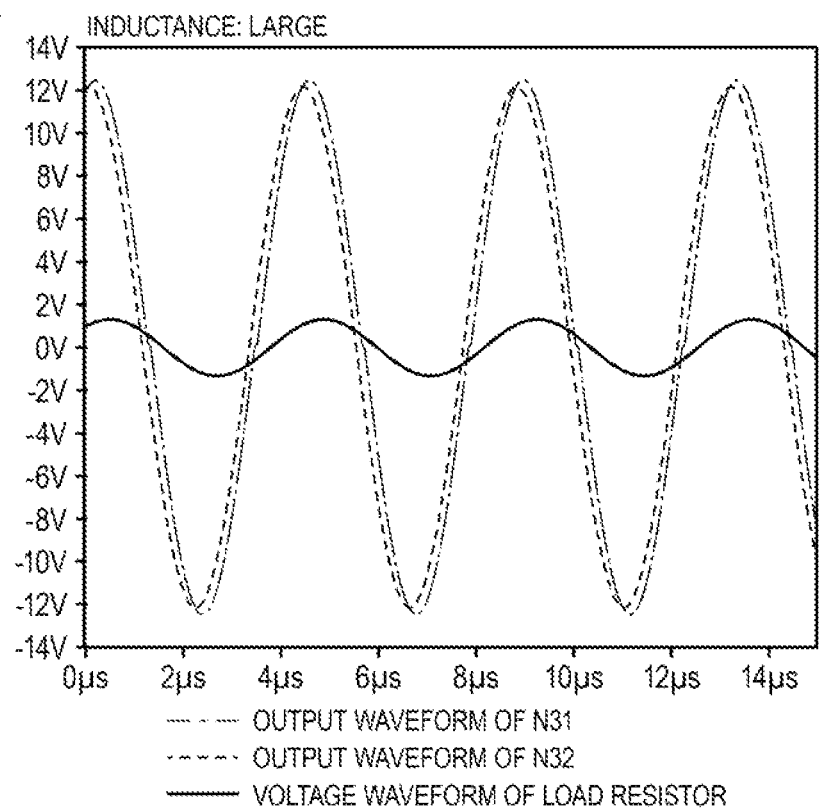

FIGS. 9A and 9B are graphs each illustrating a result of simulating a voltage change at each point in the power supply circuit 1 according to Example 2. FIG. 9A illustrates a simulation result in a case where the inductance value of the primary-side control coil Lf21 is set to the first value, and FIG. 9B illustrates a simulation result in a case where the inductance value of the primary-side control coil Lf21 is set to the second value larger than the first value. A voltage waveform at each point of the primary-side circuit 2 in Example 2 is similar to that in Example 1 (FIGS. 5A to 6B).

FIGS. 9A and 9B illustrate a voltage waveform (output waveform) induced in the power reception coil N31, a voltage waveform (output waveform) induced in the power reception coil N32, and a voltage waveform of the load resistor.

As can be seen from FIG. 9A, in a state where the inductance value of the primary-side control coil Lf21 is the first value (small), the phase of the voltage waveform generated in the power reception coil N31 and the phase of the voltage waveform generated in the power reception coil N32 are greatly shifted from each other, and a combined voltage waveform is relatively large.

Meanwhile, as can be seen from FIG. 9B, in a state where the inductance value of the primary-side control coil Lf21 is the second value (large), a phase difference between the voltage waveform generated in the power reception coil N31 and the voltage waveform generated in the power reception coil N32 is small, so that a combined voltage waveform is smaller than that in the case of FIG. 9A.

As described above, according to Example 2, it has been demonstrated that the output voltage can be stabilized by the phase shift operation by the phase shift filter F20 in the power supply circuit 1 of the first embodiment even when employing a configuration in which the secondary-side circuit 3 outputs a sine wave voltage.

Example 3

Example 3 shows a result of verifying the effect of the second embodiment described above by simulation.

Figure 10:
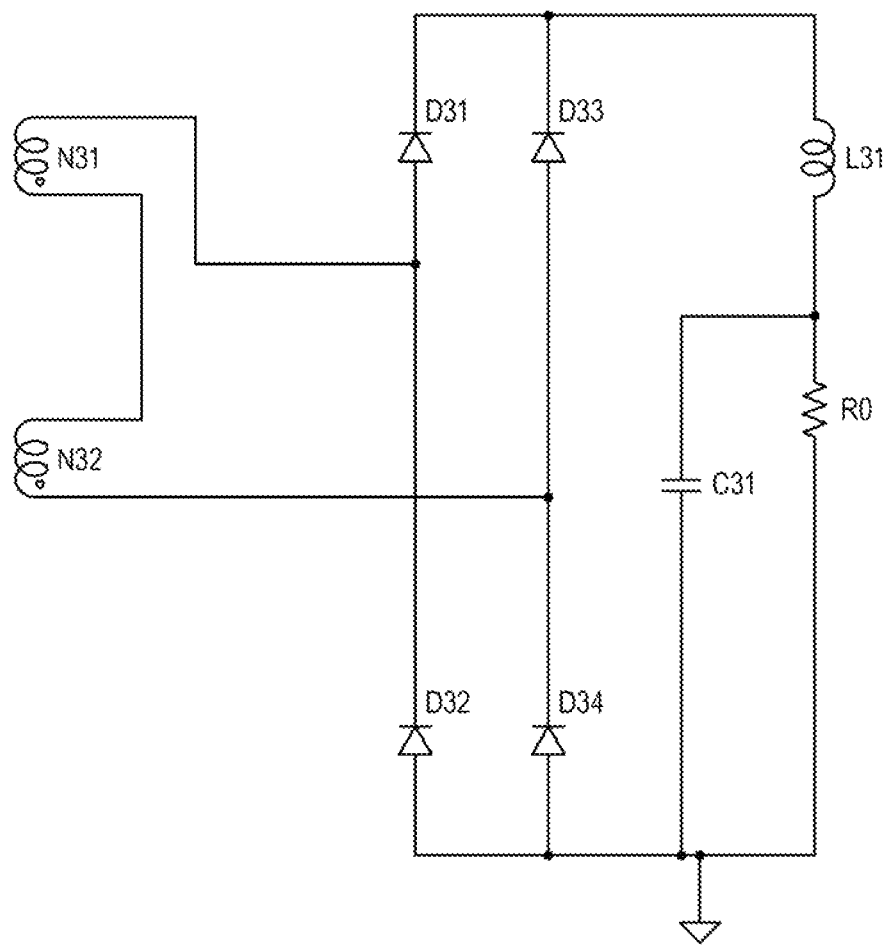
FIG. 10 is a circuit diagram of a secondary-side circuit of a power supply circuit according to Example 3.

FIG. 10 is a circuit diagram of a secondary-side circuit 3 of a power supply circuit 1 according to Example 3.

In Example 3, unlike Examples 1 and 2, the power reception coils N31 and N32 are connected such that coil voltages are in phase. Also in the simulation of Example 3, similarly to Example 1, an inductance value of the primary-side control coil Lf21 was set virtually manually. Therefore, the reference voltage circuit RV30 is not provided in the secondary-side circuit 3, and the load resistor RO is connected thereto. The primary-side circuit 2 has a configuration similar to that in the second embodiment illustrated in FIG. 3.

FIGS. 11A and 11B are graphs each illustrating a result of simulating a voltage change at each point in the power supply circuit 1 according to Example 3. FIG. 11A illustrates a simulation result in a case where the inductance value of the primary-side control coil Lf21 is set to the first value (small), and FIG. 11B illustrates a simulation result in a case where the inductance value of the primary-side control coil Lf21 is set to the second value (large) larger than the first value.

FIGS. 11A and 11B illustrate a voltage waveform (output waveform) between the drain and the source of the transistor Q12 of the master circuit 10, a voltage waveform (output waveform) between the drain and the source of the transistor Q22 of the slave circuit 20, and a direct-current voltage level applied to the load resistor.

As can be seen from FIG. 11A, in a state where the inductance value of the primary-side control coil Lf21 is the first value (small), the phase of the voltage waveform of the transistor Q12 of the master circuit 10 and the phase of the voltage waveform of the transistor Q22 of the slave circuit 20 are greatly shifted from each other, and a direct-current voltage level of a combined voltage waveform after full-wave rectification is low (2.4 V).

Meanwhile, as can be seen from FIG. 11B, in a state where the inductance value of the primary-side control coil Lf21 is the second value (large), the phase shift between the voltage waveform of the transistor Q12 of the master circuit 10 and the voltage waveform of the transistor Q22 of the slave circuit 20 is small, and a direct-current voltage level of a combined voltage waveform after full-wave rectification is higher (12.7 V) than that in the case of FIG. 11A.

As described above, according to Example 3, it has been demonstrated that also in the power supply circuit 1 of the second embodiment in which the power reception coil N31 and the power reception coil N32 are connected such that the coil voltages are in phase in the secondary-side circuit 3, the output voltage can be controlled by changing the phase shift amount by the phase shift filter F20 depending on the magnitude of the inductance value of the primary-side control coil Lf21, and eventually, the output voltage can be stabilized.

Part or all of the above-described embodiments and modifications can also be specified as follows. However, the above-described embodiments and modifications are not limited to the following description.

(1)

An output stabilization circuit comprising:
a primary-side circuit including a first self-excited oscillator circuit and a second self-excited oscillator circuit connected to a direct-current power supply; and
a secondary-side circuit configured to obtain an output voltage by oscillation of the first self-excited oscillator circuit and the second self-excited oscillator circuit, wherein
the first self-excited oscillator circuit includes:
a first power transmission coil;
a first resonant capacitor constituting a resonant circuit together with the first power transmission coil;
a first pair of switching elements connected to the first power transmission coil; and
a first feedback coil magnetically coupled to the first power transmission coil and connected to each control electrode of the first pair of switching elements,
the second self-excited oscillator circuit includes:
a second power transmission coil;
a second resonant capacitor constituting a resonant circuit together with the second power transmission coil;
a second pair of switching elements connected to the second power transmission coil;
a second feedback coil magnetically coupled to the first feedback coil and connected to each control electrode of the second pair of switching elements; and
a phase shift filter connected between the second feedback coil and each control electrode of the second pair of switching elements,
the secondary-side circuit includes a secondary-side control coil in which a magnitude of a flowing current is controlled depending on a magnitude of the output voltage, and
the phase shift filter includes a primary-side control coil magnetically coupled to the secondary-side control coil and having a characteristic that an inductance changes depending on a current flowing through the secondary-side control coil.

(2)

The output stabilization circuit according to (1), wherein the secondary-side circuit further includes:
a first power reception coil constituting a transformer together with the first power transmission coil; and
a second power reception coil constituting a transformer together with the second power transmission coil,
the first power reception coil and the second power reception coil are connected such that coil voltages are opposite in phase,
the first feedback coil and the second feedback coil are magnetically coupled such that polarities are in a same direction, and
the phase shift filter further includes a capacitor connected in parallel to the primary-side control coil and the second feedback coil.

(3)

The output stabilization circuit according to (1), wherein the secondary-side circuit further includes:
a first power reception coil constituting a transformer together with the first power transmission coil; and
a second power reception coil constituting a transformer together with the second power transmission coil,
the first power reception coil and the second power reception coil are connected such that coil voltages are in phase,
the first feedback coil and the second feedback coil are magnetically coupled such that polarities are in opposite directions, and
the phase shift filter further includes a capacitor connected in parallel to the primary-side control coil and the second feedback coil.

(4)

The output stabilization circuit according to (1), wherein the secondary-side circuit further includes:
a first power reception coil constituting a transformer together with the first power transmission coil; and
a second power reception coil constituting a transformer together with the second power transmission coil,
the first power reception coil and the second power reception coil are connected such that coil voltages are in phase,
the first feedback coil and the second feedback coil are magnetically coupled such that polarities are in a same direction,
the phase shift filter further includes a capacitor, and
the primary-side control coil is connected in parallel to the capacitor of the phase shift filter and the second feedback coil.

(5)

A DC/DC converter circuit comprising the output stabilization circuit according to any one of (1) to (4), wherein the secondary-side circuit includes:
a first power reception coil constituting a transformer together with the first power transmission coil;
a second power reception coil constituting a transformer together with the second power transmission coil; and a DC conversion circuit configured to convert an alternating-current voltage generated in the first power reception coil and the second power reception coil into a direct-current voltage.

What is claimed is:

1. An output stabilization circuit comprising:
a primary-side circuit including a first self-excited oscillator circuit and a second self-excited oscillator circuit connected to a direct-current power supply; and
a secondary-side circuit configured to obtain an output voltage by oscillation of the first self-excited oscillator circuit and the second self-excited oscillator circuit, wherein
the first self-excited oscillator circuit includes:
a first power transmission coil;
a first resonant capacitor constituting a resonant circuit together with the first power transmission coil;
a first pair of switching elements connected to the first power transmission coil; and
a first feedback coil magnetically coupled to the first power transmission coil and connected to each control electrode of the first pair of switching elements,
the second self-excited oscillator circuit includes:
a second power transmission coil;
a second resonant capacitor constituting a resonant circuit together with the second power transmission coil;
a second pair of switching elements connected to the second power transmission coil;
a second feedback coil magnetically coupled to the first feedback coil and connected to each control electrode of the second pair of switching elements; and
a phase shift filter connected between the second feedback coil and each control electrode of the second pair of switching elements,
the secondary-side circuit includes a secondary-side control coil in which a magnitude of a flowing current is controlled depending on a magnitude of the output voltage, and
the phase shift filter includes a primary-side control coil magnetically coupled to the secondary-side control coil and having a characteristic that an inductance changes depending on a current flowing through the secondary-side control coil.

2. The output stabilization circuit according to claim 1, wherein
the secondary-side circuit further includes:
a first power reception coil constituting a transformer together with the first power transmission coil; and
a second power reception coil constituting a transformer together with the second power transmission coil,
the first power reception coil and the second power reception coil are connected such that coil voltages are opposite in phase,
the first feedback coil and the second feedback coil are magnetically coupled such that polarities are in a same direction, and
the phase shift filter further includes a capacitor connected in parallel to the primary-side control coil and the second feedback coil.

3. The output stabilization circuit according to claim 1, wherein
the secondary-side circuit further includes:
a first power reception coil constituting a transformer together with the first power transmission coil; and
a second power reception coil constituting a transformer together with the second power transmission coil,
the first power reception coil and the second power reception coil are connected such that coil voltages are in phase,
the first feedback coil and the second feedback coil are magnetically coupled such that polarities are in opposite directions, and
the phase shift filter further includes a capacitor connected in parallel to the primary-side control coil and the second feedback coil.

4. The output stabilization circuit according to claim 1, wherein
the secondary-side circuit further includes:
a first power reception coil constituting a transformer together with the first power transmission coil; and
a second power reception coil constituting a transformer together with the second power transmission coil,
the first power reception coil and the second power reception coil are connected such that coil voltages are in phase,
the first feedback coil and the second feedback coil are magnetically coupled such that polarities are in a same direction,
the phase shift filter further includes a capacitor, and
the primary-side control coil is connected in parallel to the capacitor of the phase shift filter and the second feedback coil.

5. A DC/DC converter circuit comprising the output stabilization circuit according to claim 1, wherein
the secondary-side circuit includes:
a first power reception coil constituting a transformer together with the first power transmission coil;
a second power reception coil constituting a transformer together with the second power transmission coil; and
a DC conversion circuit configured to convert an alternating-current voltage generated in the first power reception coil and the second power reception coil into a direct-current voltage.

* * * * *